(12) United States Patent
Lee et al.

(10) Patent No.: US 11,221,644 B2
(45) Date of Patent: Jan. 11, 2022

(54) SYSTEM FOR TRANSCEIVING DATA BASED ON CLOCK TRANSITION TIME

(71) Applicant: Samsung Electronics Co., Ltd., Suwon-si (KR)

(72) Inventors: Sooeun Lee, Yongin-si (KR); Byungsub Kim, Pohang-si (KR)

(73) Assignees: Samsung Electronics Co., Ltd., Gyeonggi-do (KR); Postech Academy-Industry Foundation, Gyeongsangbuk-do (KR)

( * ) Notice: Subject to any disclaimer, the term of this patent is extended or adjusted under 35 U.S.C. 154(b) by 292 days.

(21) Appl. No.: 16/413,212

(22) Filed: May 15, 2019

(65) Prior Publication Data

US 2019/0354133 A1 Nov. 21, 2019

(30) Foreign Application Priority Data

May 21, 2018 (KR) .................. 10-2018-0057992
Feb. 13, 2019 (KR) .................. 10-2019-0016843

(51) Int. Cl.
*G06F 1/10* (2006.01)
*H04L 25/03* (2006.01)
*G06F 1/08* (2006.01)

(52) U.S. Cl.
CPC .............. *G06F 1/105* (2013.01); *G06F 1/08* (2013.01); *H04L 25/03006* (2013.01)

(58) Field of Classification Search
CPC ....... G06F 1/105; G06F 1/08; H04L 25/03006
USPC ........................................... 327/172
See application file for complete search history.

(56) References Cited

U.S. PATENT DOCUMENTS

| 6,931,562 B1* | 8/2005 | Radjassamy | G06F 1/12 |
| | | | 375/354 |
| 7,215,165 B2* | 5/2007 | Yamamoto | H03L 7/081 |
| | | | 327/156 |
| 7,489,743 B2 | 2/2009 | Koh et al. | |
| 8,077,770 B2 | 12/2011 | Lee et al. | |
| 8,253,451 B1 | 8/2012 | Hsieh et al. | |
| 8,525,609 B1* | 9/2013 | Sadasivam | H03K 7/08 |
| | | | 332/109 |
| 8,861,667 B1 | 10/2014 | Zerbe et al. | |
| 9,490,755 B2 | 11/2016 | Ahmed et al. | |

(Continued)

OTHER PUBLICATIONS

Bulzacchelli, John F. et al. "A 28-GB/s 4-Tap FFE/15-Tap DFE Serial Link Transceiver in 32-nm SOI CMOS Technology," *IEEE Journal of Solid-State Circuits* 47.12 (2012): 3232-3248.

(Continued)

*Primary Examiner* — Tomi Skibinski
(74) *Attorney, Agent, or Firm* — Harness, Dickey & Pierce, P.L.C.

(57) ABSTRACT

A system for transceiving data based on a clock transition time is provided. A transmitting device included in the system includes at least one first transmitting circuit configured to transmit data via a wired channel by changing a clock transition time based on the data, wherein the at least one first transmitting circuit includes a skew controller configured to output a skew clock generated by controlling a duty ratio and a skew of an input clock, and a phase-difference modulator configured to output a transmission signal including information about the data generated by changing a transition time of the skew clock based on the data.

10 Claims, 14 Drawing Sheets

(56) References Cited

U.S. PATENT DOCUMENTS

| | | | | |
|---|---|---|---|---|
| 2003/0108265 | A1* | 6/2003 | Rao | H04J 14/08 |
| | | | | 385/11 |
| 2004/0022339 | A1 | 2/2004 | Nakao | |
| 2015/0214939 | A1* | 7/2015 | Talwalkar | H03C 3/403 |
| | | | | 327/172 |
| 2015/0229433 | A1* | 8/2015 | Inada | H04L 27/2096 |
| | | | | 398/65 |
| 2016/0352434 | A1* | 12/2016 | Forsberg | H04B 10/541 |
| 2017/0180055 | A1* | 6/2017 | Yu | H04B 10/6163 |

OTHER PUBLICATIONS

Kim, Byungsub et al. "A 10-GB/s Compact Low-Power Serial I/O With DFE-IIR Equalization in 65-nm CMOS." *IEEE Journal of Solid-State Circuits* 44.12 (2009): 3526-3538.

Peng, Pen-Jui et al. "A 56Gb/s PAM-4/NRZ Transceiver in 40-nm CMOS." *IEEE International Solid-State Circuits Conference, Digest of Technical Papers* (2017): 110-111.

Lee, Sooeun et al. "A 7.86Gb/s/pin 1.96pJ/b Compact Single-Ended TRX and CDR with Phase-Difference Modulation for Highly Reflective Memory Interfaces." Feb. 13, 2018 IEEE International Solid-State Circuits Conference.

W.-Y. Shin et al., "A 4.8Gb/s Impedance-Matched Bidirectional Multi-Drop Transceiver for High-Capacity Memory Interface," ISSCC Dig. Tech. Papers, pp. 494-495, Feb. 2011.

H.-W. Lim et al., "A 5.8Gb/s Adaptive Integrating Duobinary-Based DFE Receiver for Multi-Drop Memory Interface," ISSCC Dig. Tech. Papers, pp. 182-183, Feb. 2015.

K. Gharibdoust et al., "A 7.5mW 7.5Gb/s Mixed NRZ/Multi-Tone Serial-Data Transceiver for Multi-Drop Memory Interfaces in 40nm CMOS" ISSCC Dig. Tech. Papers, pp. 180-181, Feb. 2015.

Y. Du et al., "A 16-GB/s 14.7-mW Tri-Band Cognitive Serial Link Transmitter with Forwarded Clock to Enable PAM-16/256-QAM and Channel Response Detection," IEEE J. Solid-State Circuits, vol. 52, No. 4, pp. 1111-1121, Apr. 2017.

T. Kawamoto et al. "Multi-Standard 185fsrms 0.3-to-28Gb/s 40dB Backplane Signal Conditioner with Adaptive Pattern-Match 36-Tap DFE and Data-Rate-Adjustment PLL in 28nm CMOS," IEEE Int. Solid-State Circuits Dig. Tech. Papers, Feb. 2015, pp. 54-55.

S.-M. Lee, et al., "A 27% reduction in transceiver power for single-ended point-to-point DRAM interface with the termination resistance of 4×Z0 at both TX and RX," in IEEE Int. Solid-State Circuits Dig. Tech. Papers, Feb. 2013, pp. 308-309.

J.-H. Kim, et al., "A power reduction of 37% in a differential serial link transceiver by increasing the termination resistance," in IEEE Asian Solid-State Circuit Conf., Nov. 2013, pp. 221-224.

E. Depaoli et al., "A 4.9pJ/b 16-to-64Gb/s PAM-4 VSR Transceiver in 28nm FDSOI CMOS", IEEE Int. Solid-State Circuits Dig. Tech. Papers, Feb. 2018, pp. 112-114.

G. Kiarash, "Hybrid NRZ/Multi-Tone Serial Data Transceiver for Multi-Drop Memory Interfaces", JSSC, 2015.

* cited by examiner

SYSTEM FOR TRANSCEIVING DATA BASED ON CLOCK TRANSITION TIME

CROSS-REFERENCE TO RELATED APPLICATIONS

This application claims the benefit of Korean Patent Applications Nos. 10-2018-0057992 and 10-2019-0016843, respectively filed on May 21, 2018 and Feb. 13, 2019, in the Korean Intellectual Property Office, the disclosures of which are incorporated herein in their entirety by reference.

BACKGROUND

The inventive concepts relate to a transmitting device for transmitting data based on a clock transition time, a receiving device for identifying data based on a difference between a clock transition time of a reference signal and a clock transition time of a reception signal, and a system including the transmitting device and the receiving device.

As a computational capacity of a computing system has exponentially increased due to complementary metal-oxide semiconductor (CMOS) scaling, higher speed data communication is required to support an increased amount of data communication between computing system modules. However, it is getting more and more difficult to achieve a higher speed of data communication because signal integrity may be degraded due to channel discontinuity at higher speeds. The channel discontinuity causes irregular inter-symbol interference (ISI) due to signal reflection, which may induce a communication error in the higher speed data communication. Thus, it is difficult to realize higher speed communication in a channel having channel discontinuity.

A representative example of a channel having severe ISI due to channel discontinuity may include a multi-drop channel mainly used for a memory interface.

SUMMARY

In order to achieve a high data transmission rate at the channel having discontinuity without degradation of the signal integrity, a need has arisen to efficiently compensate for irregular ISI via a transceiver of each of the computing system modules.

The inventive concepts provide a transmitting device for transmitting data based on a clock transition time, a receiving device for identifying data based on a difference between a clock transition time of a reference signal and a clock transition time of a reception signal, and a system including the transmitting device and the receiving device.

According to an aspect of the inventive concepts, there is provided a transmitting device including at least one first transmitting circuit configured to transmit data via a wired channel by changing a clock transition time based on the data, wherein the at least one first transmitting circuit includes a skew controller configured to output a skew clock generated by controlling a duty ratio and a skew of an input clock, and a phase-difference modulator configured to output a transmission signal including information about the data generated by changing a transition time of the skew clock based on the data.

According to another aspect of the inventive concepts, there is provided a receiving device for receiving a reception signal generated by changing a clock transition time based on data, and a reference signal which is a data identification basis with respect to the reception signal, the receiving device including a first amplifier configured to amplify the reception signal, a second amplifier configured to amplify the reference signal, a phase-difference amplifying circuit configured to amplify a phase-difference identifying window of the reception signal and the reference signal, and an identifying circuit configured to identify the data based on the amplified phase-difference identifying window amplified in synchronization with a recovery clock.

According to another aspect of the inventive concepts, there is provided a method of transceiving data, the method including generating a skew clock by controlling a duty ratio and a skew of an input clock, generating a transmission signal by transitioning a logic level of the skew clock at a first time or a second time based on transmission data, and transmitting the transmission signal through a transmitting channel, wherein the generating of the transmission signal includes, when the transmission data has a first bit, increasing a pull-up current, and when the transmission data has a second bit, increasing a pull-down current.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF EXAMPLE EMBODIMENTS

Figure 1:
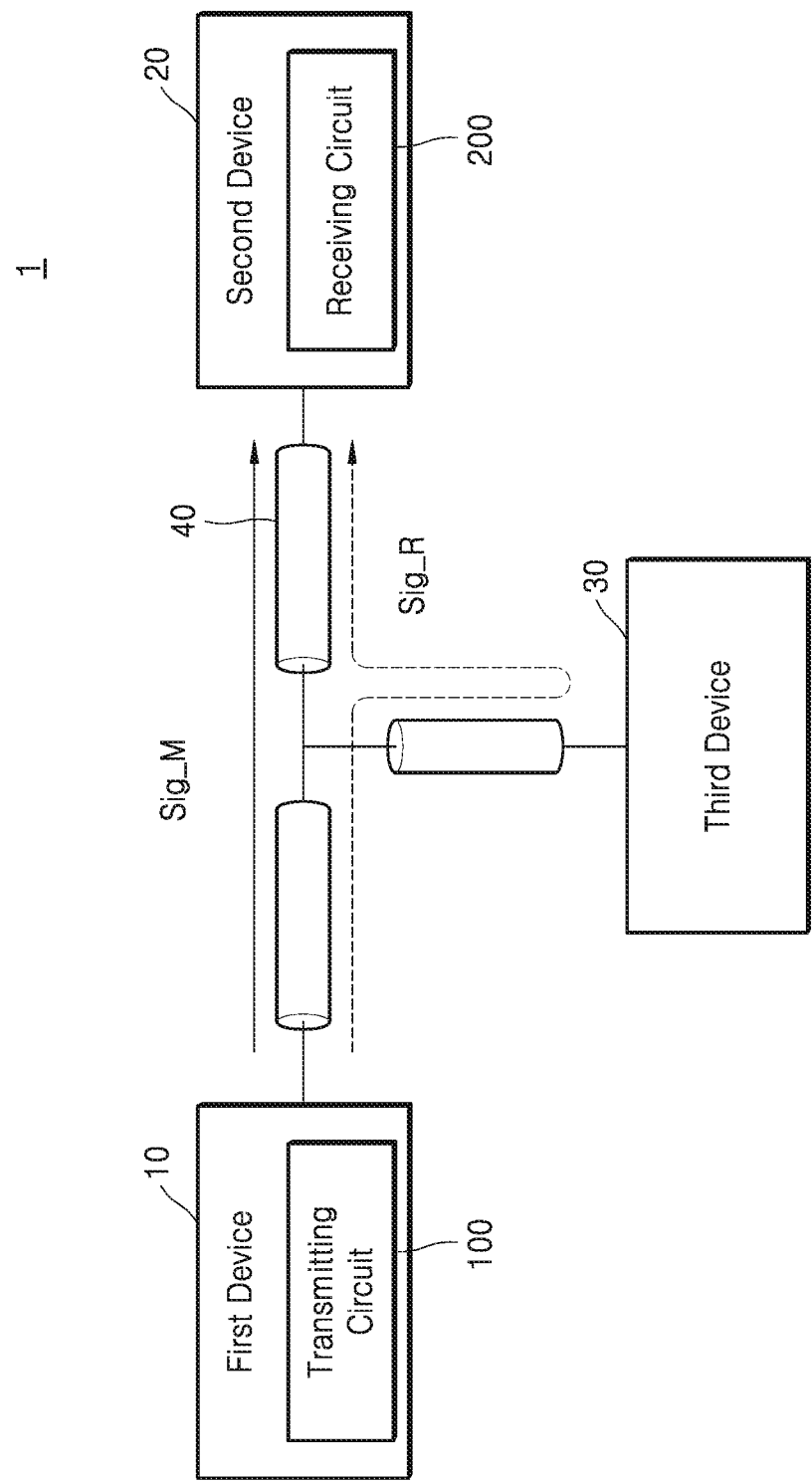
FIG. 1 is a diagram of a system according to an example embodiment.

FIG. 1 is a diagram of a system 1 according to an example embodiment.

Referring to FIG. 1, the system 1 may include a first device 10, a second device 20, a third device 30, and/or an interconnect 40. The system 1 may be realized as a portable electronic device, a computer, or a data server. The first device 10 may operate as a transmitting device transmitting data, and to this end, the first device 10 may include a transmitting circuit 100. For example, the first device 10 may be realized as a processor or a memory controller.

The second device 20 and the third device 30 may operate as receiving devices receiving data, and to this end, the second device 20 may include a receiving circuit 200. For example, the second device 20 and the third device 30 may include memory devices, such as a dual-in-line memory module (DIMM). To this end, the second device 20 and the third device 30 may include at least one memory device. For example, the second device 20 and the third device 30 may include volatile memory devices, such as dynamic random access memory (DRAM), static random access memory (SRAM), rambus DRAM (RDRAM), thyristor RAM (T-RAM), zero capacitor RAM (Z-RAM), and twin transistor RAM (TTRAM), or non-volatile memory devices, such as electrically erasable programmable read-only memory (EEPROM), flash memory, magnetic RAM (MRAM), spin transfer torque MRAM (STT-MRAM), conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, a molecular electronics memory device, or insulator resistance change memory.

The first device 10, the second device 20, and the third device 30 may be electrically connected to one another via the interconnect 40. The interconnect 40 may transmit a data access (for example, data writing, data reading, etc.) to a target device (for example, the second device 20 or the third device 30) from the first device 10. For example, the interconnect 40 may connect the first device 10, the second device 20, and the third device 30 based on a multi-drop method, and thus, the first device 10, the second device 20, and the third device 30 may be simultaneously connected to a circuit.

In an example in which the second device 20 is a target device, the first device 10 may output a transmission signal including data to be transmitted to the second device 20. However, according to the multi-drop method, when the second device 20 is a target device, the third device 30 is also connected to the first device 10 through the interconnect 40, and thus, the interconnect 40 is divided into a portion connected to the second device 20 and a portion connected to the third device 30, which may induce discontinuity. Due to the discontinuity, a reception signal received by the second device 20 may be divided into a main signal Sig_M, which corresponds to the transmission signal directly received by the second device 20, and a reflection signal Sig_R, which corresponds to the transmission signal transmitted to the third device 30 and received by the second device 20 after being reflected from the third device 30. The main signal Sig_M and the reflection signal Sig_R may have different communication paths from each other, and thus, may be received by the second device 20 at different times from each other. The reflection signal Sig_R may operate as noise for the main signal Sig_M, and as a ratio of a signal magnitude of the reflection signal Sig_R to a signal magnitude of the main signal Sig_M increases, the receiving quality (for example, a data read rate due to inter-symbol interference (ISI)) of the main signal Sig_M of the receiving device 20 may decrease.

The transmitting circuit 100 according to the inventive concepts may change a transition time of a logic level of a clock based on data and transmit the clock, of which the transition time of the logic level is changed based on the data, and the receiving circuit 200 may identify the data based on the clock, of which the transition time is changed. Since the transition time of the clock is changed based on the data, a pulse width used by the transmission signal to indicate the data may be decreased, which may induce a decrease in the ratio of the signal magnitude of the reflection signal Sig_R to the signal magnitude of the main signal Sig_M. This aspect will be described in detail below with reference to FIGS. 8A and 8B.

Figure 2A:
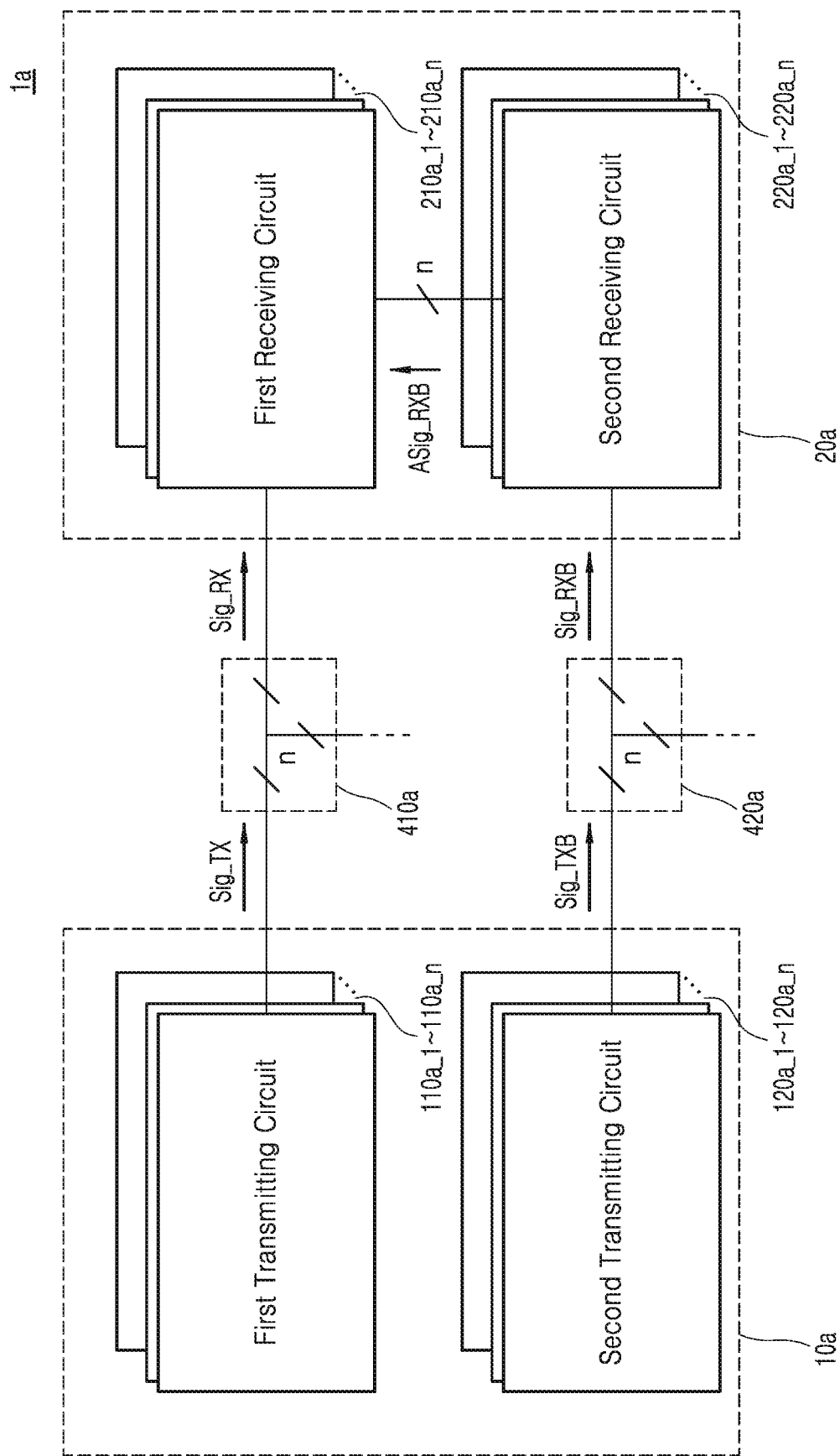
FIG. 2A is a block diagram of a system according to an example embodiment.

FIG. 2A is a block diagram of a system 1a according to an example embodiment. In detail, FIG. 2A is the block diagram of the system 1a for transceiving data based on a differential mode.

Referring to FIG. 2A, the system 1a may include a first device 10a, a second device 20a, and/or a plurality of interconnects 410a and 420a. The first device 10a may include a plurality of first transmitting circuits 110a_1 through 110a_n and a plurality of second transmitting circuits 120a_1 through 120a_n. The second device 20a may include a plurality of first receiving circuits 210a_1 through 210a_n and a plurality of second receiving circuits 220a_1 through 220a_n. The plurality of interconnects 410a and 420a may include a plurality of first interconnects 410a and a plurality of second interconnects 420a. The first device 10a may operate as a transmitting device, the second device 20a may operate as a receiving device, and the plurality of interconnects 410a and 420a may operate as transmitting channels.

The plurality of first transmitting circuits 110a_1 through 110a_n may be connected to the plurality of first receiving circuits 210a_1 through 210a_n via the plurality of first interconnects 410a. The plurality of first transmitting circuits 110a_1 through 110a_n may output a transmission signal Sig_TX to the corresponding plurality of first interconnects 410a, respectively, and the plurality of first receiving circuits 210a_1 through 210a_n may receive a reception signal Sig_RX from the corresponding plurality of first interconnects 410a, respectively. The transmission signal Sig_TX and the reception signal Sig_RX may include data that the first device 10a is to transmit to the second device 20a.

The plurality of second transmitting circuits 120a_1 through 120a_n may be connected to the plurality of second receiving circuits 220a_1 through 220a_n via the plurality of second interconnects 420a. The plurality of second transmitting circuits 120a_1 through 120a_n may output a complementary transmission signal Sig_TXB to the corresponding plurality of second interconnects 420a, respectively, and the plurality of second receiving circuits 220a_1 through 220a_n may receive a complementary reception signal Sig_RXB from the corresponding plurality of second interconnects 420a, respectively. The complementary transmission signal Sig_TXB and the complementary reception signal Sig_RXB may include data complementary to the data that the first device 10a is to transmit to the second device 20a. That is, the complementary transmission signal Sig_TXB may include complementary data that is complementary to the data included in the transmission signal Sig_TX. For example, when the transmission signal Sig_TX includes data 1, the complementary transmission signal Sig_TXB may include data 0, and when the transmission signal Sig_TX includes data 0, the complementary transmission signal Sig_TXB may include data 1.

According to the inventive concepts, the plurality of first transmitting circuits 110a_1 through 110a_n and the plurality of second transmitting circuits 120a_1 through 120a_n may generate the transmission signal Sig_Tx and the complementary transmission signal Sig_TXB by changing a transition time of a clock based on the data.

The plurality of second receiving circuits 220a_1 through 220a_n may amplify the complementary reception signal Sig_RXB and output the amplified complementary reception signal ASig_RXB to the plurality of first receiving circuits 210a_1 through 210a_n. The plurality of first receiving circuits 210a_1 through 210a_n may amplify the reception signal Sig_RX received from the plurality of first transmitting circuits 110a_1 through 110a_n and identify the data based on the amplified reception signal ASig_RX and the amplified complementary reception signal ASig_RXB received from the plurality of second receiving circuits 220a_1 through 220a_n.

According to the inventive concepts, the plurality of first receiving circuits 210a_1 through 210a_n may identify the data based on a difference between a clock transition time of the reception signal Sig_RX and a clock transition time of the complementary reception signal Sig_RXB.

In this specification, the mode in which data is transmitted based on the transmission signal Sig_TX and the complementary transmission signal Sig_RXB that are complementary to each other and the data is identified based on the reception signal Sig_RX and the complementary reception signal Sig_RXB that are complementary to each other, as described with reference to FIG. 2A, may be referred to as the differential mode.

Figure 2B:
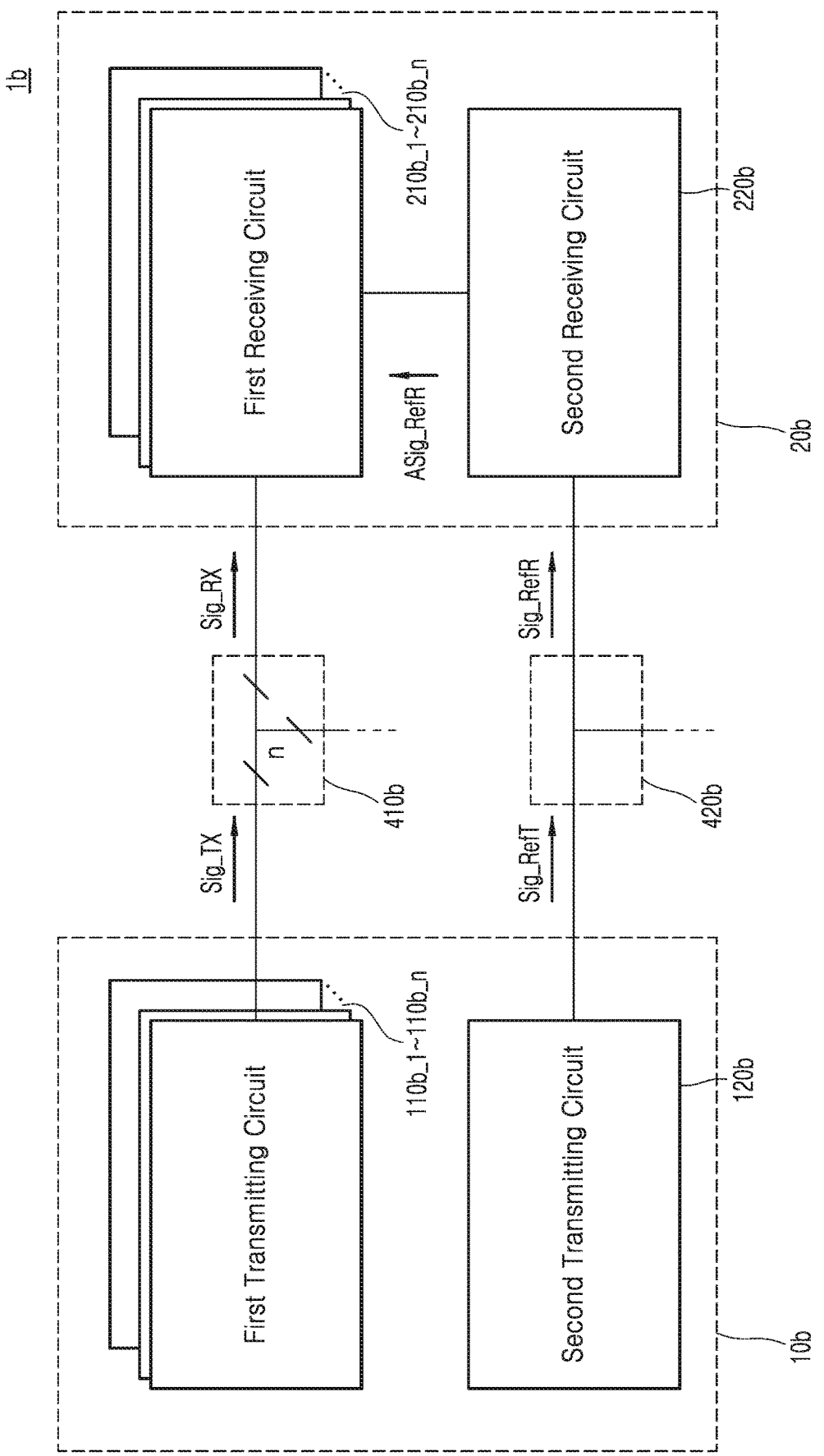
FIG. 2B is a block diagram of a system according to an example embodiment.

In detail, FIG. 2B is a block diagram of a system 1b for transceiving data based on a single mode. Aspects that are the same as the aspects of FIG. 2A will not be described.

Referring to FIG. 2B, the system 1b may include a first device 10b, a second device 20b, and/or a plurality of interconnects 410b and 420b. The first device 10b may include a plurality of first transmitting circuits 110b_1 through 110b_n and a second transmitting circuit 120b. The second device 20b may include a plurality of first receiving circuits 210b_1 through 210b_n and a second receiving circuit 220b. The plurality of interconnects 410b and 420b may include a plurality of first interconnects 410b and a second interconnect 420b. The first device 10b may operate as a transmitting device, the second device 20b may operate as a receiving device, and the plurality of interconnects 410b and 420b may operate as a transmitting channel.

The plurality of first transmitting circuits 110b_1 through 110b_n may output a transmission signal Sig_TX to the corresponding plurality of first interconnects 410b, respectively, and the plurality of first receiving circuits 210b_1 through 210b_n may receive a reception signal Sig_RX from the corresponding plurality of first interconnects 410b, respectively. The transmission signal Sig_TX and the reception signal Sig_RX may include data to be transmitted by the first device 10b to the second device 20b.

The second transmitting circuit 120b may output a transmission reference signal Sig_RefT to the second interconnect 420b, and the second receiving circuit 220b may receive a reception reference signal Sig_RefR from the second interconnect 420b. The transmission reference signal Sig_RefT and the reception reference signal Sig_RefR may be formed as a basic clock without including data. The second receiving circuit 220b may amplify the reception reference signal Sig_RefR and output the amplified reception reference signal ASig_RefR to the plurality of first receiving circuits 210b_1 through 210b_n. The plurality of first receiving circuits 210b_1 through 210b_n may amplify the reception signal Sig_RX received from the plurality of first transmitting circuits 110b_1 through 110b_n and identify the data based on the amplified reception signal and the amplified reception reference signal ASig_RefR received from the second receiving circuit 220b.

According to the inventive concepts, the plurality of first receiving circuits 210b_1 through 210b_n may identify the data based on a difference between a clock transition time of the reception signal Sig_RX and a clock transition time of the reception reference signal Sig_RefR.

In this specification, the mode in which the data is identified based on the reception signal Sig_RX and the reception reference signal Sig_RefR, as described with reference to FIG. 2B, may be referred to as the single mode.

Figure 3:
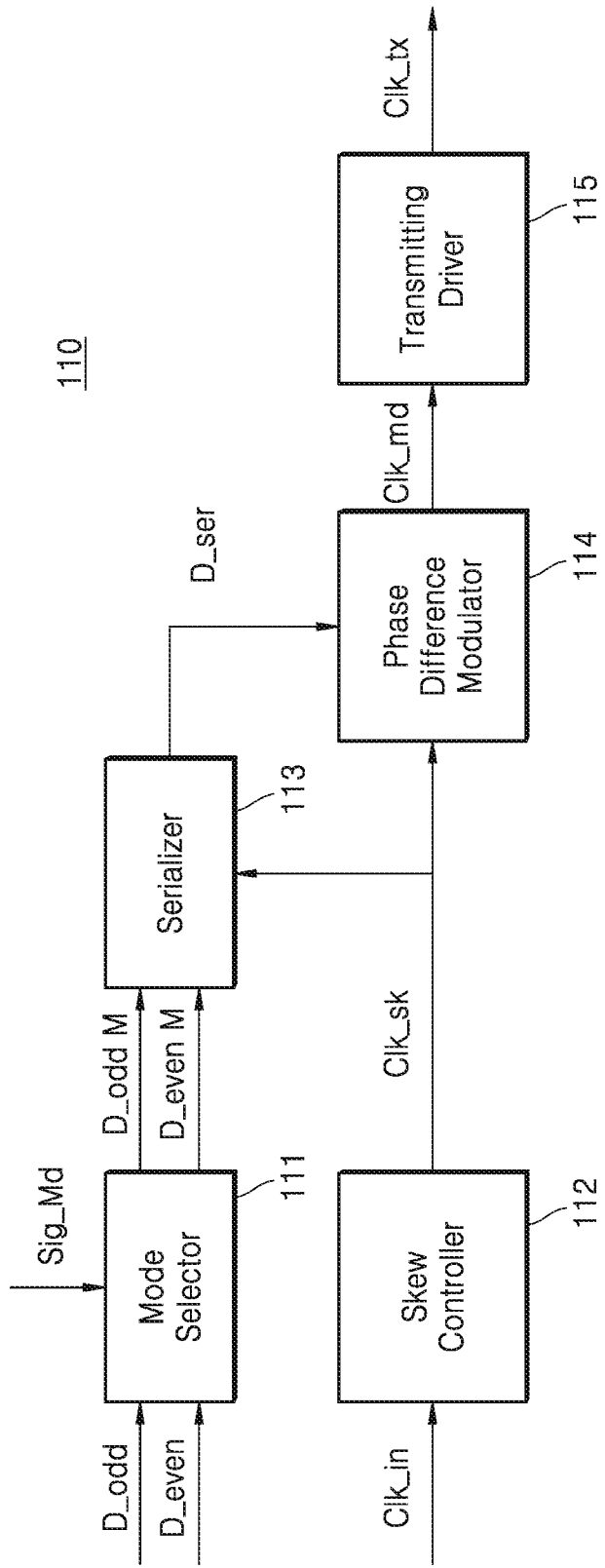
FIG. 3 is a block diagram of a transmitting circuit according to an example embodiment.

FIG. 3 is a block diagram of a transmitting circuit 110 according to an example embodiment.

Referring to FIG. 3, the transmitting circuit 110 may include a mode selector 111, a skew controller 112, a serializer 113, a phase-difference modulator 114, and/or a transmitting driver 115. The transmitting circuit 110 may include the first transmitting circuits 110a_1 through 110a_n and 110b_1 through 110b_n or the second transmitting circuits 120a_1 through 120a n and 120b described in detail with reference to FIGS. 2A and 2B.

The mode selector 111 may select a mode of the transmitting circuit 110 as any one of a differential mode and a single mode, based on a mode signal Sig_Md. In the differential mode, the mode selector 111 may output odd data D_odd and even data D_even as mode-selected odd data D_oddM and mode-selected even data D_evenM, respectively, to an input terminal of the serializer 113. In the single mode, the mode selector 111 may not output the odd data D_odd and the even data D_even to the input terminal of the serializer 113 and may output the mode-selected odd data D_oddM as a first logic level and the mode-selected even data D_evenM as a second logic level.

The skew controller 112 may receive an input clock Clk_in and may control a duty ratio and a skew of the input clock Clk_in to generate a skew clock Clk_sk. For example, the skew controller 112 may receive the input clock Clk_in from a clock generator (not shown) outside the transmitting circuit 110, control the duty ratio of the input clock Clk_in as 1:1, and control the skew of the input clock Clk_in to generate the skew clock Clk_sk. The skew controller 112 may output the generated skew clock Clk_sk to the serializer 113 and the phase-difference modulator 114.

The serializer 113 may alternately output the mode-selected odd data D_oddM and the mode-selected even data D_evenM to the phase-difference modulator 114 as serial data D_ser, in synchronization with the skew clock Clk_sk. When the transmitting circuit 110 corresponds to the first transmitting circuits 110a_1 through 110a_n and 110b_1 through 110b_n described above in detail with reference to FIGS. 2A and 2B, the mode-selected odd data D_oddM and the mode-selected even data D_evenM may be the data to be transmitted. When the transmitting circuit 110 corresponds to the second transmitting circuits 120a_1 through 120a_n described above in detail with reference to FIG. 2A, the mode-selected odd data D_oddM and the mode-selected even data D_evenM may be the complementary data complementary to the data to be transmitted. When the transmitting circuit 110 corresponds to the second transmitting circuit 120b described above in detail with reference to FIG. 2B, the mode-selected odd data D_oddM and the mode-selected even data D_evenM may have a first logic level or a second logic level, respectively, regardless of the data to be transmitted.

The phase-difference modulator 114 may control a transition time of a logic level of the skew clock Clk_sk based on the serial data D_ser. According to an embodiment, the phase-difference modulator 114 may increase a pull-up current when the serial data D_ser has a first logic level and may increase a pull-down current when the serial data D_ser has a second logic level. The phase-difference modulator 114 may generate a modulating clock Clk_md by controlling the transition time of the logic level.

The transmitting driver 115 may transmit a transmission clock Clk_tx corresponding to the modulating clock Clk_md by driving a transmission line (for example, the interconnect 40 of FIG. 1).

Here, the transmission clock Clk_tx output by the transmitting circuit 110 may correspond to the transmission signal Sig_TX in FIGS. 2A and 2B, when the transmitting circuit 110 corresponds to the first transmitting circuits 110*a*_1 through 110*a_n* and 110*b*_1 through 110*b_n* described in detail with reference to FIGS. 2A and 2B, may correspond to the complementary transmission signal Sig_TXB when the transmitting circuit 110 corresponds to the second transmitting circuits 120*a*_1 through 120*a_n* described in detail with reference to FIG. 2A, and may correspond to the transmission reference signal Sig_RefT when the transmitting circuit 110 corresponds to the second transmitting circuit 120*b* described in detail with reference to FIG. 2B.

FIG. 3 illustrates only one phase-difference modulator 114. However, according to another embodiment, the transmitting circuit 110 may include a plurality of phase-difference modulators and may perform a plurality of modulating operations.

Figure 4:
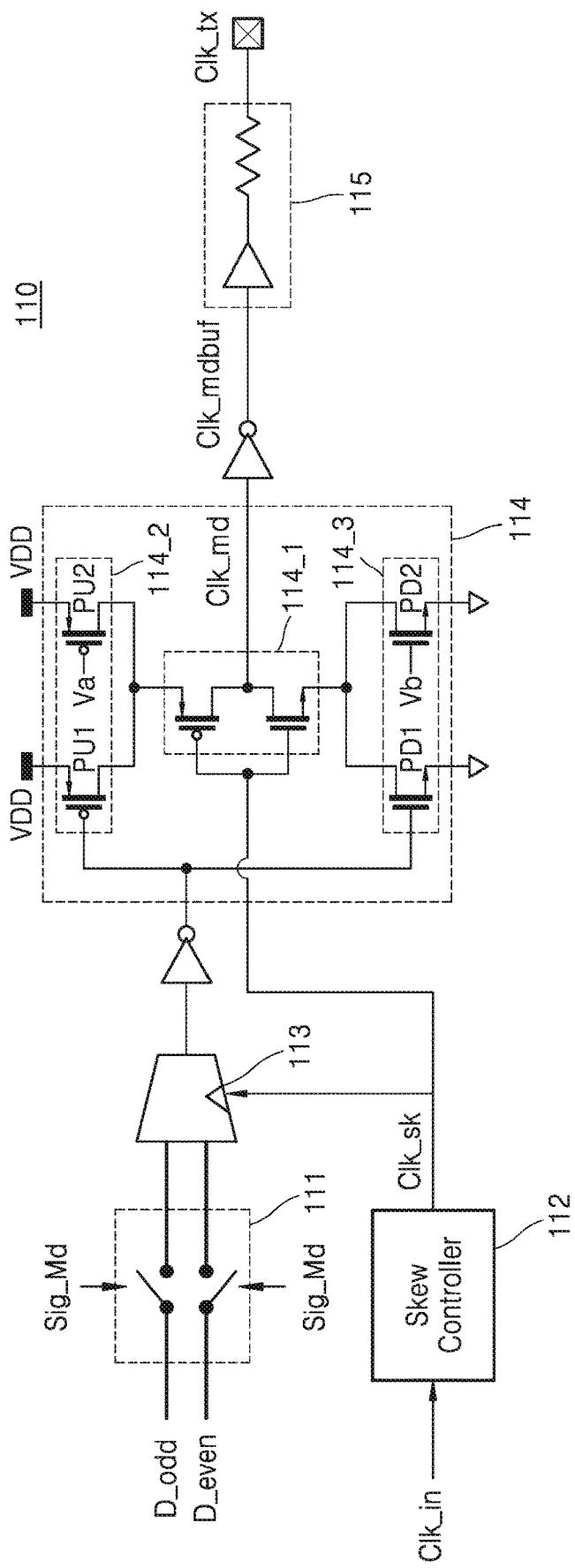
FIG. 4 is a circuit diagram of a transmitting circuit according to an example embodiment.

FIG. 4 is a circuit diagram of the transmitting circuit 110 according to an example embodiment. Aspects that are the same as the aspects of FIG. 3 will not be described.

Referring to FIG. 4, the transmitting circuit 110 may include the mode selector 111, the skew controller 112, the serializer 113, the phase-difference modulator 114, and/or the transmitting driver 115.

The mode selector 111 may include a plurality of switches controlled by a mode signal Sig_Md. In the differential mode, a switch between an input terminal and an output terminal of the mode selector 111 may be short-circuited so that the odd data D_odd and the even data D_even may be output to the serializer 113. When the mode signal Sig_md is the single mode, the switch between the input terminal and the output terminal of the mode selector 111 may be open and switches (not shown) between a node having a voltage corresponding to a first logic level or a second logic level and the output terminal may be short-circuited so that the odd data D_odd and the even data D_even may not be output to the input terminal of the serializer 113 and the mode-selected odd data D_oddM may be output as the first logic level and the mode-selected even data D_evenM may be output as the second logic level.

The serializer 113 may receive the skew clock Clk_sk and may alternately output the mode-selected odd data D_oddM and the mode-selected even data D_evenM to the phase-difference modulator 114 based on a falling edge and a rising edge of the skew clock Clk_sk.

The phase-difference modulator 114 may include an inverter circuit 114_1, a pull-up circuit 114_2, and a pull-down circuit 114_3. The pull-up circuit 114_2 may include a first pull-up transistor PU1 and a second pull-up transistor PU2. Although not shown, according to an embodiment, the pull-up circuit 114_2 may include a plurality of second pull-up transistors PU2. The pull-up circuit 114_2 may increase a pull-up current applied to the inverter circuit 114_1, when the pull-up circuit 114_2 receives a signal of a first bit (for example, "0").

The pull-up circuit 114_2 may include the first pull-up transistor PU1 having a gate, to which a data signal is applied, and the second pull-up transistor PU2 having a gate, to which a first voltage Va is applied. When the data signal is of the first bit, the first pull-up transistor PU1 may be turned on and the pull-up current may be increased. According to an embodiment, the first pull-up transistor PU1 may have a greater size than the second pull-up transistor PU2, and thus, the amount of pull-up currents applied to the inverter circuit 114_1 by the first pull-up transistor PU1 may be greater than the amount of pull-up currents applied to the inverter circuit 114_1 by the second pull-up transistor PU2.

The pull-down circuit 114_3 may include a first pull-down transistor PD1 and a second pull-down transistor PD2. Although not shown, according to an embodiment, the pull-down circuit 114_3 may include a plurality of second pull-down transistors PD2. The pull-down circuit 114_3 may increase a pull-down current withdrawn from the inverter circuit 114_1, when the pull-down circuit 114_3 receives a signal of a second bit (for example, "1").

The pull-up circuit 114_3 may include the first pull-down transistor PD1 having a gate, to which a data signal is applied, and the second pull-down transistor PD2 having a gate, to which a second voltage Vb is applied. When the data signal is of the second bit, the first pull-down transistor PD1 may be turned on and the pull-down current may be increased. According to an embodiment, the first pull-down transistor PD1 may have a greater size than the second pull-down transistor PD2, and thus, the amount of pull-down currents withdrawn from the inverter circuit 114_1 by the first pull-down transistor PD1 may be greater than the amount of pull-down currents withdrawn from the inverter circuit 114_1 by the second pull-down transistor PD2.

The inverter circuit 114_1 may control a transition time of a logic level of the skew clock Clk_sk based on the pull-up current and the pull-down current. The inverter circuit 114_1 may output a modulating clock Clk_md, with respect to which a transition time of a logic level is controlled, and may buffer the modulating clock Clk_md to generate a buffered modulating clock Clk_mdbuf. The transmitting driver 115 may transmit a generated transmission clock Clk_tx based on the buffered modulating clock Clk_mdbuf by driving a transmission line.

The phase-difference modulator 114 according to the inventive concepts may control the transition time of the clock by controlling the pull-up current and the pull-down current according to the logic level of the data.

Figure 5:
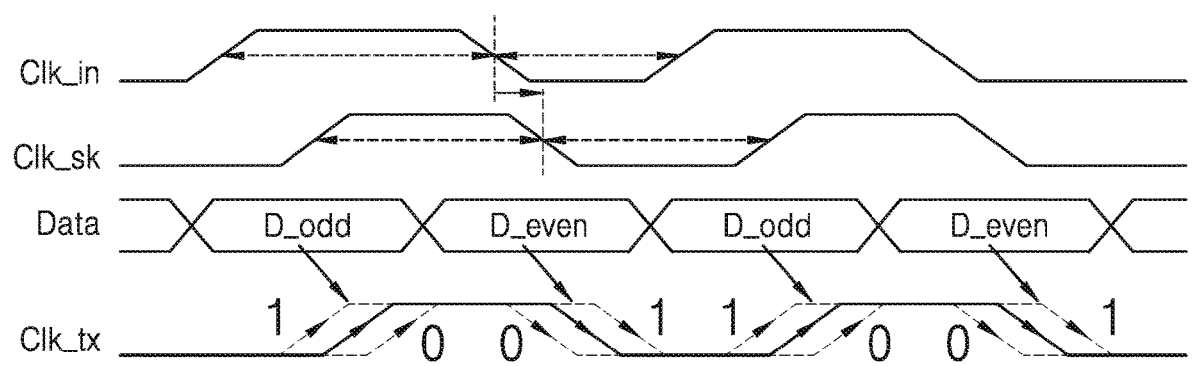
FIG. 5 is a timing diagram of an operation of a transmitting circuit according to an example embodiment.

FIG. 5 is a timing diagram of an operation of the transmitting circuit 110 according to an example embodiment.

Referring to FIGS. 3 and 5, the transmitting circuit 110 may generate the skew clock Clk_sk having a duty ratio of 1:1 and a controlled skew, by controlling a duty ratio and a skew of the input clock Clk_in. When the transmitting circuit 110 corresponds to the first transmitting circuits 110*a*_1 through 110*a_n* and 110*b*_1 through 110*b_n* described in detail with reference to FIGS. 2A and 2B and the second transmitting circuits 120*a*_1 through 120*a_n* described in detail with reference to FIG. 2A, the transmitting circuit 110 may control the transition time of the skew clock Clk_sk based on data Data. When the transmitting circuit 110 corresponds to the second transmitting circuit 120b described in detail with reference to FIG. 2B, the transmitting circuit 110 may generate the transmission reference signal Sig_RefT that is a basic clock from the skew clock Clk_sk, regardless of the data Data.

For example, when the transmitting circuit 110 corresponds to the first transmitting circuits 110b_1 through 110b_n described in detail with reference to FIG. 2B, and when the odd data D_odd has a first bit (for example, "0"), the transmitting circuit 110 may delay a transition time of the transmission clock Clk_tx from logic low to logic high, compared to the transmission reference signal Sig_RefT. When the odd data D_odd has a second bit (for example, "1"), the transmitting circuit 110 may advance the transition time of the transmission clock Clk_tx from logic low to logic high, compared to the transmission reference signal Sig_RefT.

For example, when the transmitting circuit 110 corresponds to the first transmitting circuits 110b_1 through 110b_n described in detail with reference to FIG. 2B and when the even data D_even has the first bit (for example, "0"), the transmitting circuit 110 may advance a transition time of the transmission clock Clk_tx from logic high to logic low, compared to the transmission reference signal Sig_RefT. When the even data D_even has the second bit (for example, "1"), the transmitting circuit 110 may delay the transition time of the transmission clock Clk_tx from logic high low to logic low, compared to the transmission reference signal Sig_RefT.

Figure 6A:
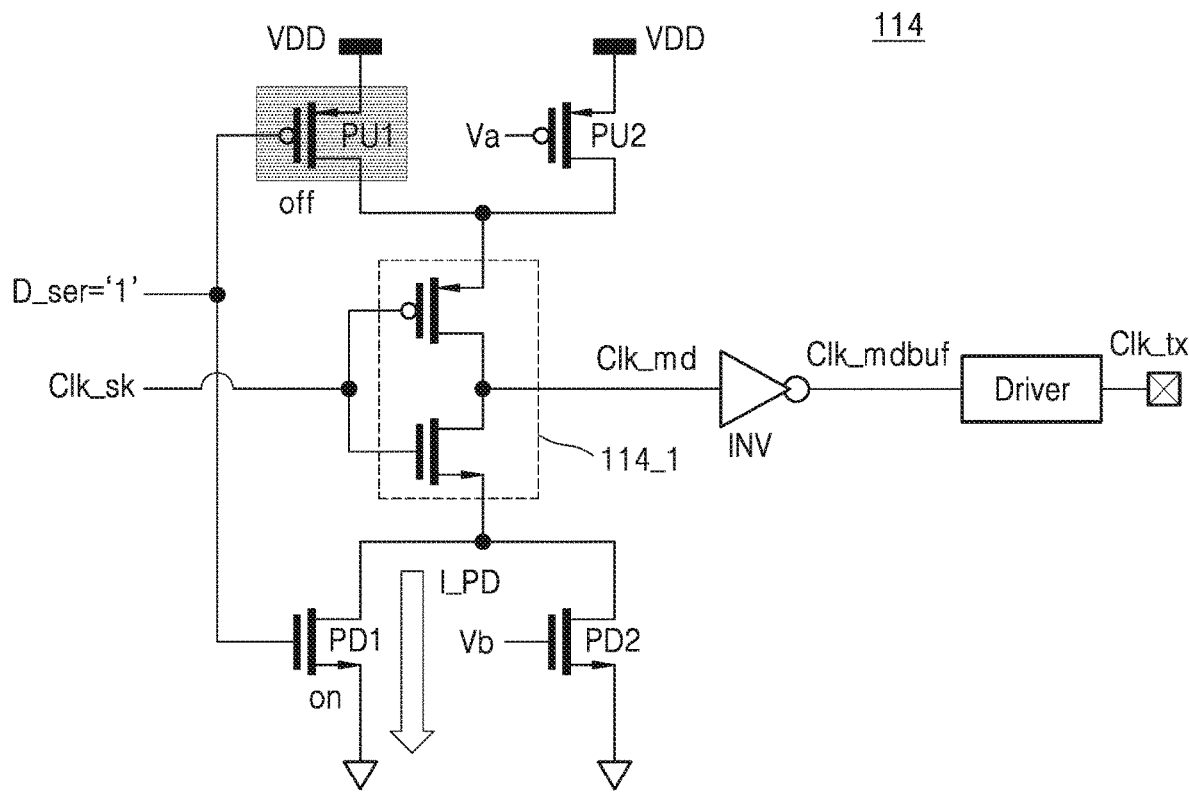
FIG. 6A is a circuit diagram of a phase-difference modulator according to an example embodiment and FIG. 6B is a timing diagram of an operation of the phase-difference modulator according to an example embodiment.
Figure 6B:
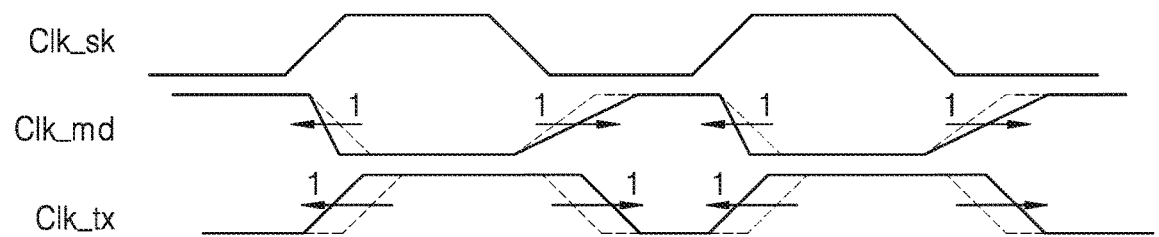

FIG. 6A is a circuit diagram of the phase-difference modulator 114 according to an example embodiment and FIG. 6B is a timing diagram of an operation of the phase-difference modulator 114, according to an example embodiment. In detail, FIGS. 6A and 6B illustrate the embodiment in which the phase-difference modulator 114 receives "1" as the serial data D_ser that is input.

Referring to FIG. 6A, the phase-difference modulator 114 may turn off the first pull-up transistor PU1 and may turn on the first pull-down transistor PD1, when the serial data D_ser is "1." Thus, a pull-down current I_PD withdrawn from the inverter circuit 114_1 may be increased.

Referring to FIG. 6B, solid lines may indicate operations of the modulating clock Clk_md and the transmission clock Clk_tx when the serial data D_ser is "1" and dashed lines may indicate the modulating clock Clk_md and the transmission clock Clk_tx in the transmitting circuit 110 (for example, the second transmitting circuit 120b described in detail with reference to FIG. 2B) for outputting a basic reference clock.

Since the pull-down current I_PD is increased in the modulating clock Clk_md generated by inverting the skew clock Clk_sk, the transition from logic high to logic low may be relatively more quickly performed. Also, since the pull-up current is decreased because the first pull-up transistor PU1 is turned off, the transition from logic low to logic high may be relatively more slowly performed. According to the operation described above, when "1" is received as the serial data D_ser, the modulating clock Clk_Md, the transition speed of which is controlled, as illustrated in FIG. 6B, may be generated. An inverter INV may output the buffered modulating clock Clk_mdbuf to an input terminal of a driver Driver and the driver Driver may generate, from the buffered modulating clock Clk_mdbuf, the transmission clock Clk_tx, the transition time of which is controlled.

Figure 7A:
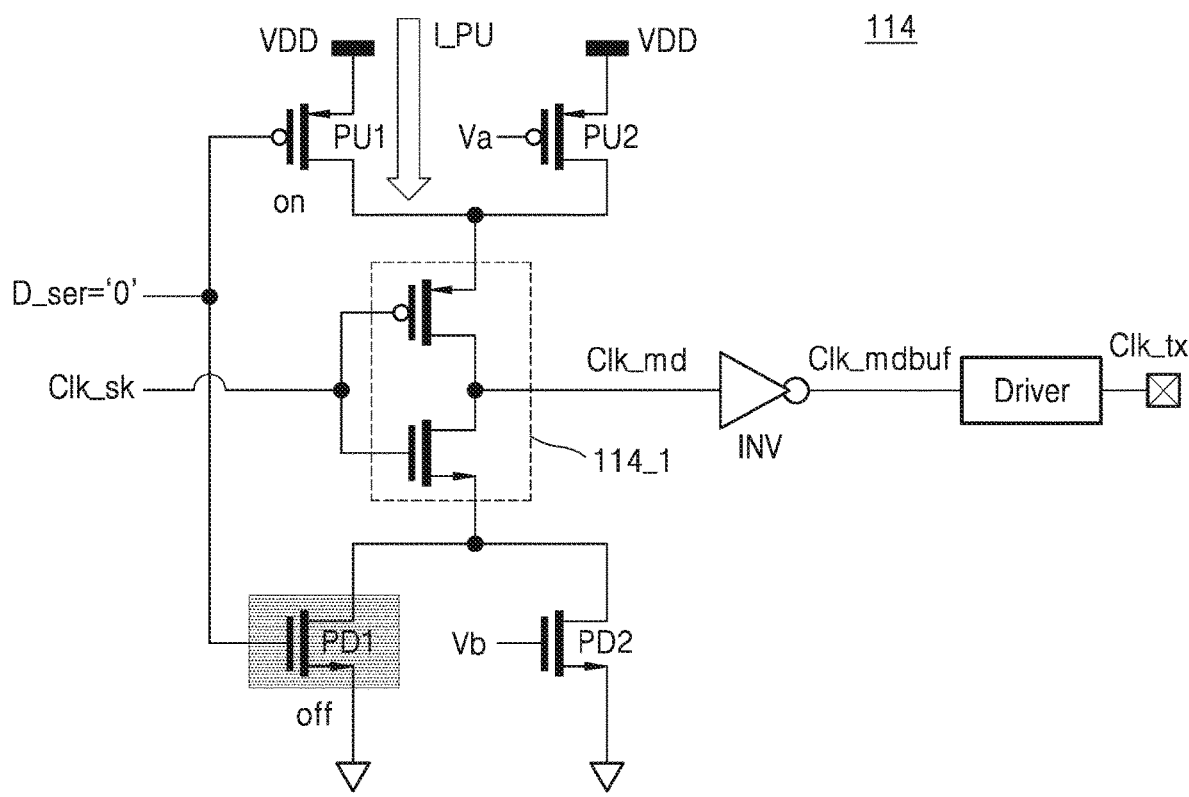
FIG. 7A is a circuit diagram of a phase-difference modulator according to an example embodiment and FIG. 7B is a timing diagram of an operation of the phase-difference modulator according to an example embodiment.
Figure 7B:
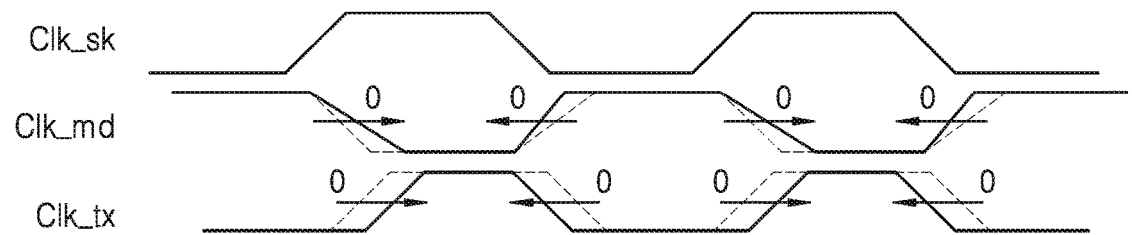

FIG. 7A is a circuit diagram of the phase-difference modulator 114 according to an example embodiment and FIG. 7B is a timing diagram of an operation of the phase-difference modulator 114, according to an example embodiment. In detail, FIGS. 7A and 7B illustrate the embodiment in which the phase-difference modulator 114 receives "0" as the serial data D_ser that is input.

Referring to FIG. 7A, the phase-difference modulator 114 may turn on the first pull-up transistor PU1 and may turn off the first pull-down transistor PD1, when the serial data D_ser is "0." Thus, the pull-up current I_PU applied to the inverter circuit 114_1 may be increased.

Referring to FIG. 7B, solid lines may indicate operations of the modulating clock Clk_md and the transmission clock Clk_tx when the serial data D_ser is "0" and dashed lines may indicate the modulating clock Clk_md and the transmission clock Clk_tx in the transmitting circuit 110 (for example, the second transmitting circuit 120b described in detail with reference to FIG. 2B) for outputting the basic reference clock.

Since the pull-up current I_PU is increased in the modulating clock Clk_md generated by inverting the skew clock Clk_sk, the transition from logic low to logic high may be relatively more quickly performed. Also, since the pull-down current is decreased because the first pull-down transistor PD1 is turned off, the transition from logic high to logic low may be relatively more slowly performed. According to the operation described above, when "0" is received as the serial data D_ser, the modulating clock Clk_Md, the transition speed of which is controlled, as illustrated in FIG. 7B, may be generated. The inverter INV may output the buffered modulating clock Clk_mdbuf to the input terminal of a driver Driver, and the driver Driver may generate, from the buffered modulating clock Clk_mdbuf, the transmission clock Clk_tx, the transition time of which is controlled.

Figure 8A:
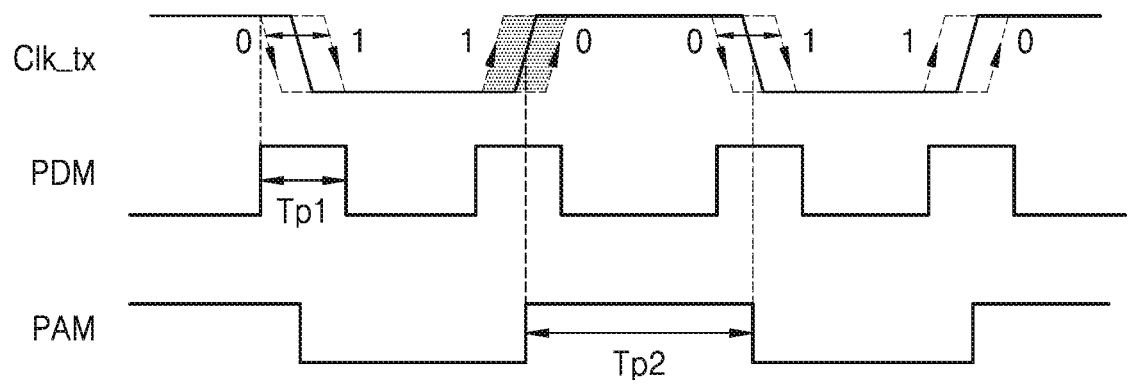
FIG. 8A is a timing diagram showing a width of a pulse used by a transmission signal to indicate data, according to an example embodiment.
Figure 8B:
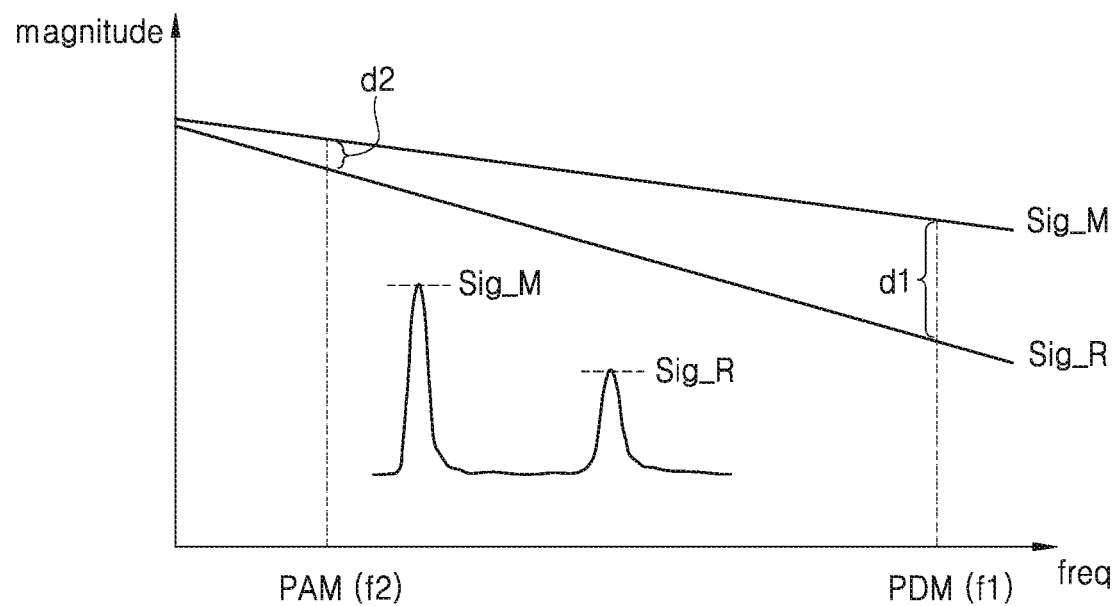
FIG. 8B is a graph showing a decrease in signal magnitude per Nyquist frequency of a transmission pulse, according to an example embodiment.

FIG. 8A is a timing diagram showing a pulse width used by a transmission signal to indicate data, according to an example embodiment, and FIG. 8B is a graph showing a decrease in signal magnitude per Nyquist frequency of a transmission pulse, according to an example embodiment.

Referring to FIG. 8A, according to a phase-difference modulation (PDM) method according to the inventive concepts, a transition time of the transmission clock Clk_tx may be modulated according to "0" and "1," and thus, a first time Tp1 is required as a pulse width required for the modulation. On the contrary, according to a pulse amplitude modulation (PAM) method according to the related art, modulation with respect to a pulse amplitude is required, and thus, a second time Tp2 is required as a pulse width required for the modulation. That is, the PDM method according to the inventive concepts may require a less pulse width (Tp1<Tp2) than the PAM method according to the related art.

FIG. 8B illustrates a decrease in signal magnitude of the transmission signal per Nyquist frequency, the transmission signal including the main signal Sig_M and the reflection signal Sig_R assuming that a transmitting device (for example, the first device 10 of FIG. 1) transmits a single pulse, wherein the main signal Sig_M is transmitted to a receiving device (for example, the second device 20 of FIG. 1) without reflection and the reflection signal Sig_R is transmitted to the receiving device after being reflected from the transmitting device by using a route connected to another device. The magnitudes of both of the main signal Sig_M and the reflection signal Sig_R included in the transmission signal may be decreased as the Nyquist frequency of the transmitted pulse is increased, and the decrease may be greater in the case of the reflection signal Sig_R than in the case of the main signal Sig_M.

As described above in detail with reference to FIG. 8A, the pulse width Tp1 used for the PDM may be less than the pulse width Tp2 used for the PAM. The Nyquist frequency of the pulse is inversely proportional to the pulse width, and thus, a first modulation frequency f1 corresponding to the PDM may be greater than a second modulation frequency f2 corresponding to the PAM. Thus, as illustrated in FIG. 8B, a first difference d1, which is a difference in magnitude between the main signal Sig_M and the reflection signal Sig_R corresponding to the first modulation frequency f1, may be greater than a second difference d2, which is a difference in magnitude between the main signal Sig_M and the reflection signal Sig_R corresponding to the second modulation frequency f2.

That is, when the PDM is performed, the difference in magnitude between the main signal Sig_M and the reflection signal Sig_R may be greater than when the PAM is performed. Accordingly, the main signal Sig_M may be less affected by the reflection signal Sig_R, and the ISI due to irregular reflection may be decreased.

Figure 9:
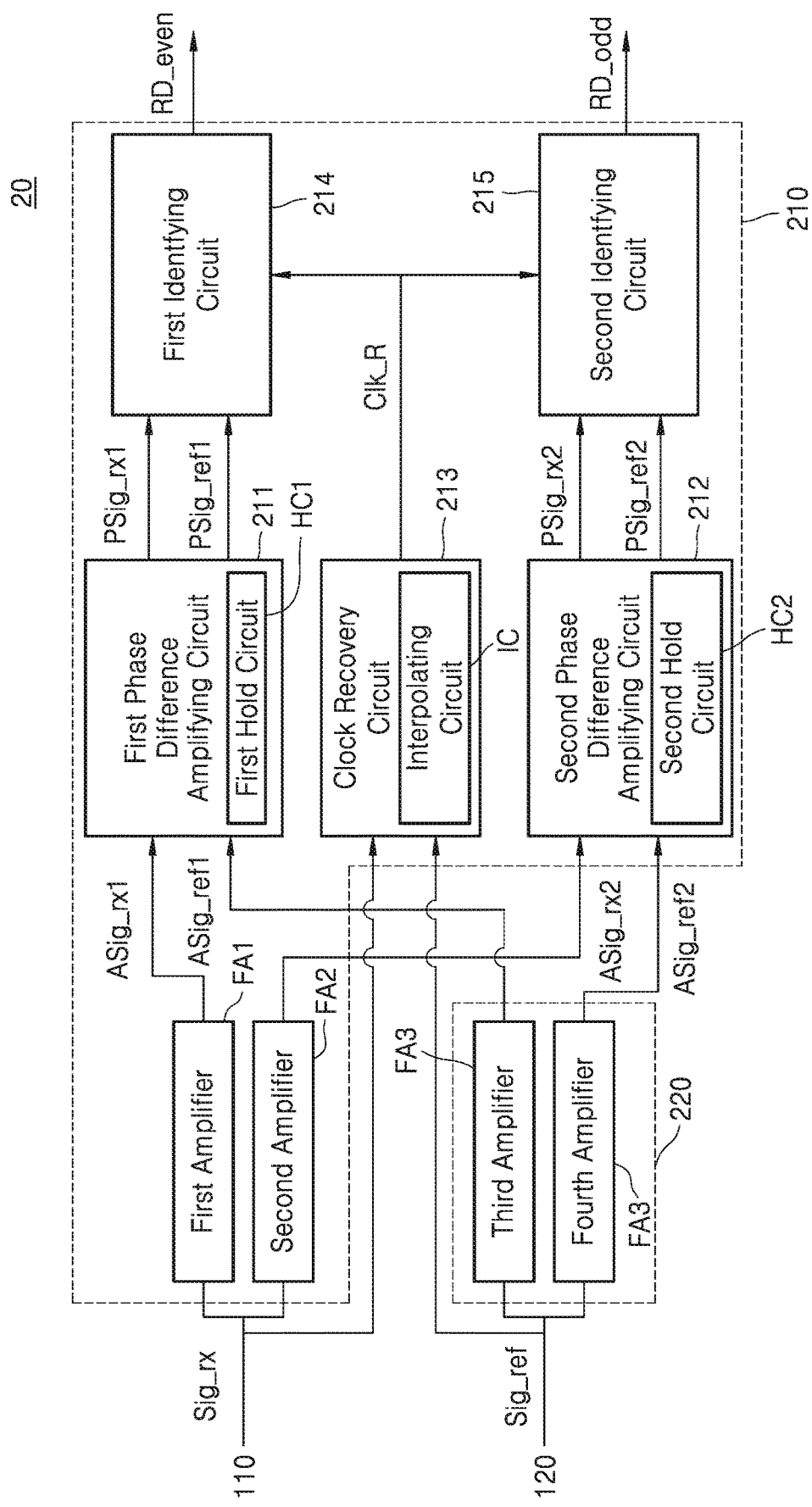
FIG. 9 is a block diagram of a receiving device according to an example embodiment.

FIG. 9 is a block diagram of the receiving device 20 according to an example embodiment.

Referring to FIG. 9, the receiving device 20 may include a first receiving circuit 210 and a second receiving circuit 220. The first receiving circuit 210 may include a first amplifier FA1, a second amplifier FA2, a first phase-difference amplifying circuit 211, a second phase-difference amplifying circuit 212, a clock recovery circuit 213, a first identifying circuit 214, and/or a second identifying circuit 215. The second receiving circuit 220 may include a third amplifier FA3 and a fourth amplifier FA4. When the receiving device 20 operates in the differential mode, the receiving device 20 may include a plurality of first receiving circuits 210 and a plurality of second receiving circuits 220, and when the receiving device 20 operates in the single mode, the receiving device 20 may include a plurality of first receiving circuits 210 and one second receiving circuit 220.

The first amplifier FA1 and the second amplifier FA2 may receive a reception signal Sig_rx and amplify the reception signal Sig_rx. For example, the first amplifier FA1 may include a transistor of a first type and may correspond to even data to advantageously operate at a falling edge of the reception signal Sig_rx and the second amplifier FA2 may include a transistor of a second type and may correspond to odd data to advantageously operate at a rising edge of the reception signal Sig_rx. The first amplifier FA1 may output a first amplified reception signal ASig_rx1 generated by amplifying the reception signal Sig_rx to the first phase-difference amplifying circuit 211, and the second amplifier FA2 may output a second amplified reception signal ASig_rx2 generated by amplifying the reception signal Sig_rx to the second phase-difference amplifying circuit 212.

The third amplifier FA3 and the fourth amplifier FA4 may receive a reference signal Sig_ref and amplify the reference signal Sig_ref. The reference signal Sig_ref may be a complementary reception signal (Sig_RXB of FIG. 2A) in the differential mode and may be a reception reference signal (Sig_RefR of FIG. 2B) in the single mode. For example, the third amplifier FA3 may include the transistor of the first type and may correspond to the even data to advantageously operate at a falling edge of the reference signal Sig_ref and the fourth amplifier FA4 may include the transistor of the second type and may correspond to the odd data to advantageously operate at a rising edge of the reference signal Sig_ref. The third amplifier FA3 may output a first amplified reference signal ASig_ref1 generated by amplifying the reference signal Sig_ref to the first phase-difference amplifying circuit 211 and the fourth amplifier FA4 may output a second amplified reference signal ASig_ref2 generated by amplifying the reference signal Sig_ref to the second phase-difference amplifying circuit 212.

The first phase-difference amplifying circuit 211 may amplify a phase-difference identifying window of the first amplified reception signal ASig_rx1 and the first amplified reference signal ASig_ref1 to generate a first phase amplified signal PSig_rx1 and a first phase amplified reference signal PSig_ref1. The first phase-difference amplifying circuit 211 may include a first hold circuit HC1. The first hold circuit HC1 may hold the phase-difference identifying window of the first phase amplified reception signal PSig_rx1 and the first phase amplified reference signal PSig_ref1 for a longer period of time based on a unique characteristic of a transistor included in the first hold circuit HC1. For example, the first phase-difference amplifying circuit 211 may amplify the phase-difference identifying window based on a transistor of a different type from the transistors of the first amplifier FA1 and the third amplifier FA3.

The second phase-difference amplifying circuit 212 may amplify a phase-difference identifying window of the second amplified reception signal ASig_rx2 and the second amplified reference signal ASig_ref2 to generate a second phase amplified signal PSig_rx2 and a second phase amplified reference signal PSig_ref2. The second phase-difference amplifying circuit 212 may include a second hold circuit HC2. The second hold circuit HC2 may hold the phase-difference identifying window of the second phase amplified reception signal PSig_rx2 and the second phase amplified reference signal PSig_ref2 for a longer period of time based on a unique characteristic of a transistor included in the second hold circuit HC2. For example, the second phase-difference amplifying circuit 212 may amplify the phase-difference identifying window based on a transistor of a different type from the transistors of the second amplifier FA2 and the fourth amplifier FA4.

The clock recovery circuit 213 may receive the reception signal Sig_rx and the reference signal Sig_ref and may output a recovery clock Clk_R generated based on the received reception signal Sig_rx and the received reference signal Sig_ref to the first identifying circuit 214 and the second identifying circuit 215. The clock recovery circuit 213 may include an interpolating circuit IC. In the differential mode, the clock recovery circuit 213 may interpolate the reception signal Sig_rx and the reference signal Sig_ref to generate the recovery clock Clk_R. In the single mode, the clock recovery circuit 213 may generate the recovery clock Clk_R based on the reference signal Sig_ref.

The first identifying circuit 214 may identify even reception data RD_even based on the first phase amplified reception signal PSig_rx1 and the first phase amplified reference signal PSig_ref1. The even reception data RD_even may correspond to the even data to be transmitted by the transmitting device.

The second identifying circuit 215 may identify odd reception data RD_odd based on the second phase amplified reception signal PSig_rx2 and the second phase amplified reference signal PSig_ref2. The odd reception data RD_odd may correspond to the odd data to be transmitted by the transmitting device.

Figure 10:
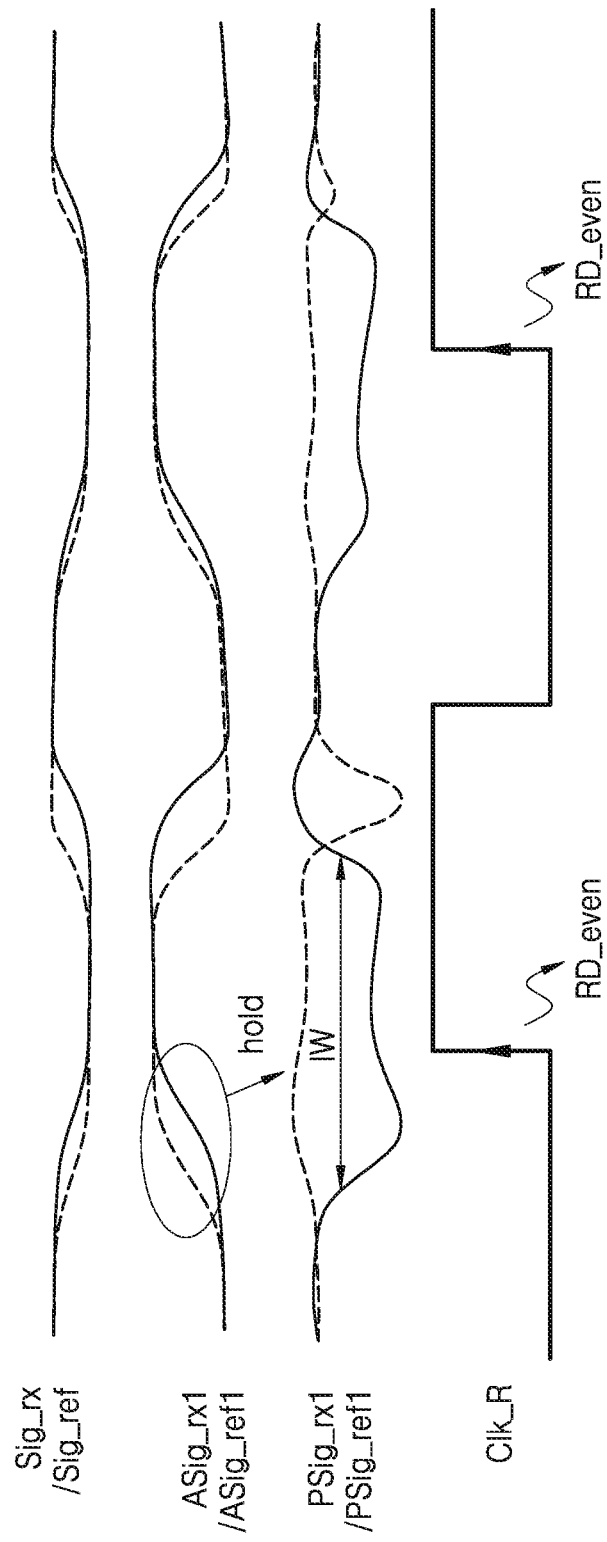
FIG. 10 is a graph showing an operation of a receiving device according to an example embodiment.

FIG. 10 is a graph showing an operation of the receiving device 20, according to an example embodiment.

Referring to FIGS. 9 and 10, solid lines may indicate the reception signal Sig_rx, the first amplified reception signal PSig_rx1, and the first phase amplified reception signal PSig_rx1, respectively, and dashed lines may indicate the reference signal Sig_ref, the first amplified reference signal PSig_ref1, and the first phase amplified reference signal PSig_ref1, respectively.

As illustrated in FIG. 10, the reception signal Sig_rx and the reference signal Sig_ref may have a certain phase-difference. A swing level of the first amplified reception signal ASig_rx1 and the first amplified reference signal ASig_ref1 generated by amplifying the reception signal Sig_rx and the reference signal Sig_ref, respectively, may be amplified. Also, a phase-difference identifying window IW may be amplified and held by phase-difference amplifying circuits 211 and 212. The first identifying circuit 214 may identify the even reception data RD_even at a rising edge of the recovery clock Clk_R located in the phase-difference identifying window IW and the second identifying circuit 215 may identify the odd reception data RD_odd at a falling edge of the recovery clock Clk_R located in the phase-difference identifying window IW.

According to an embodiment, the phase-difference amplifying circuits 211 and 212 may include the first and second hold circuits HC1 and HC2, and the phase-difference information may be held via the first and second hold circuits HC1 and HC2, so that the phase-difference identifying window IW of the recovery clock Clk_R may be increased.

Figure 11:
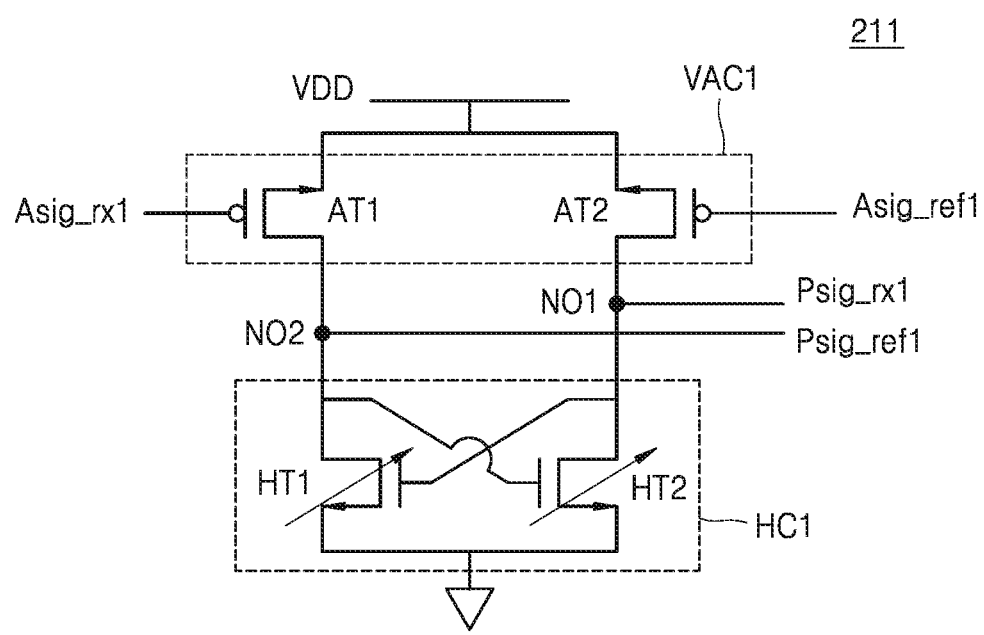
FIG. 11 is a circuit diagram of a phase-difference amplifying circuit according to an example embodiment.

FIG. 11 is a circuit diagram of the first phase-difference amplifying circuit 211 according to an example embodiment. Aspects that are the same as the aspects of FIG. 9 will not be described.

Referring to FIGS. 9 and 11, the first phase-difference amplifying circuit 211 may include a first voltage amplifying circuit VAC1 and the first hold circuit HC1. The second phase-difference amplifying circuit 212 may have a transistor of a type which is opposite to a type of a transistor of the first phase-difference amplifying circuit 211 (for example, an NMOS transistor and a PMOS transistor), but may operate substantially the same as the first phase-difference amplifying circuit 211.

The first voltage amplifying circuit VAC1 may include a first amplifying transistor AT1 and a second amplifying transistor AT2 and the first hold circuit HC1 may include a first hold transistor HT1 and a second hold transistor HT2. The first amplifying transistor AT1 and the second amplifying transistor AT2 may be transistors of a first type (for example, PMOS transistors), and the first hold transistor HT1 and the second hold transistor HT2 may be transistors of a second type (for example, NMOS transistors).

The first amplifying transistor AT1 may be located between a power voltage node VDD and a second output node NO2, and the first amplified reception signal ASig_rx1 may be applied to a gate of the first amplifying transistor AT1. The second amplifying transistor AT2 may be located between the power voltage node VDD and a first output node NO1, and the first amplified reference signal ASig_ref1 may be applied to a gate of the second amplifying transistor AT2.

The first hold transistor HT1 may have a gate connected to the first output node NO1 and may be located between the second output node NO2 and a ground voltage node. The second hold transistor HT2 may have a gate connected to the second output node NO2 and may be located between the first output node NO1 and the ground voltage node.

The first hold circuit HC1 may operate substantially the same as a latch. Since the first hold circuit HC1 includes at least one NMOS transistor unlike the first voltage amplifying circuit VAC1, which of the first hold circuit HC1 and the first voltage amplifying circuit VAC1 has a greater magnitude than the other, may be changed according to a common-mode voltage level of the first amplified reception signal ASig_rx1 and the first amplified reference signal ASig_ref1. When the common-mode voltage level is low, the first voltage amplifying circuit VAC1 has a greater magnitude than the first hold circuit HC1, and thus, an output voltage level may be amplified based on a phase-difference between the first amplified reception signal ASig_rx1 and the first amplified reference signal ASig_ref1. Also, when the common-mode voltage level is high, the first hold circuit HC1 operating in the way substantially the same as the way in which the latch operates has a greater magnitude than the first voltage amplifying circuit VAC1, and thus, the amplified output voltage level may be held. Accordingly, the first phase-difference amplifying circuit 211 may hold the phase-difference for a relatively long period of time and the phase-difference identifying window IW may be increased.

A signal of the first output node NO1 may be output to the first identifying circuit (214 of FIG. 10) as the first phase amplified reception signal PSig_rx1 and a signal of the second output node NO2 may be output to the first identifying circuit (214 of FIG. 10) as the first phase amplified reference signal PSig_ref1.

Figure 12:
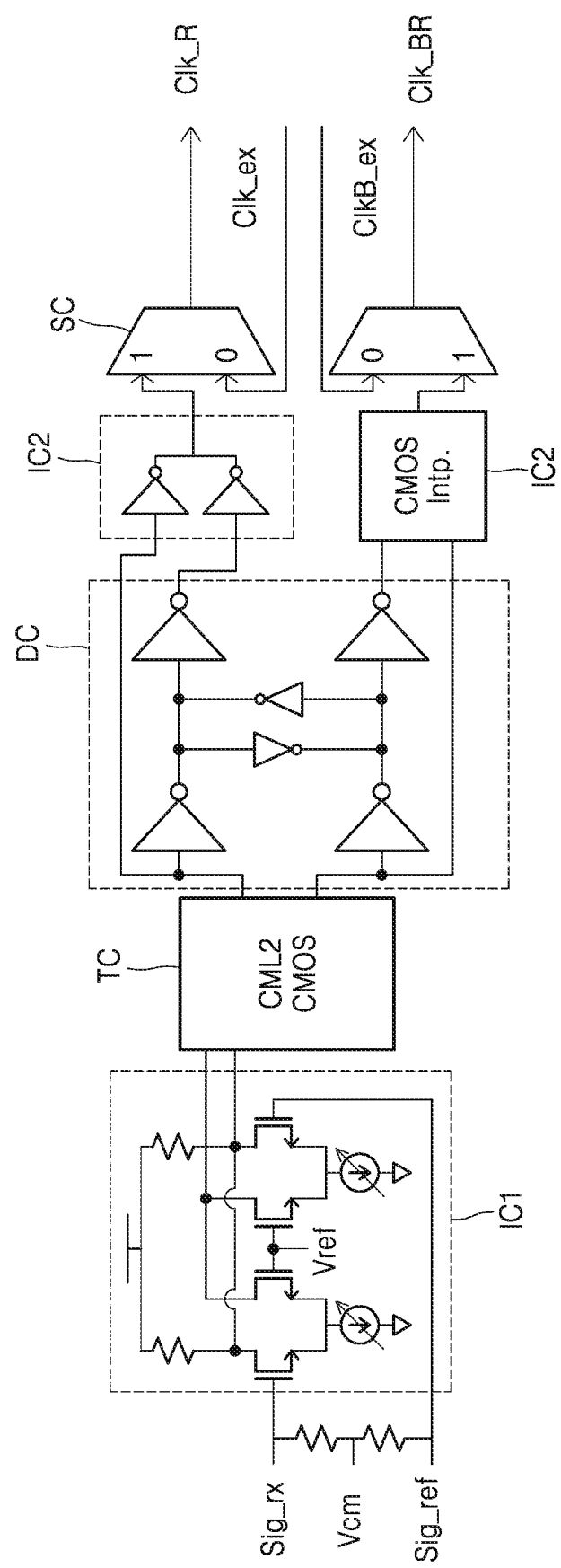
FIG. 12 is a circuit diagram of a clock recovery circuit according to an example embodiment.

FIG. 12 is a circuit diagram of the clock recovery circuit 213 according to an example embodiment.

Referring to FIG. 12, the clock recovery circuit 213 may include a first interpolating circuit IC1, a transforming circuit TC, a delay circuit DC, at least one second interpolating circuit IC2, and/or at least one selecting circuit SC.

The first interpolating circuit IC1 may generate the recovery clock Clk_R by interpolating the reception signal Sig_rx and the reference signal Sig_ref. The clock recovery circuit 213 may determine a degree of interpolation by changing a magnitude of a circuit included in the first interpolating circuit IC1. The first interpolating circuit IC1 may interpolate the reception signal Sig_rx and the reference signal Sig_ref as 1:1 when generating the recovery clock Clk_R in the differential mode and may bypass the reference signal Sig_ref when generating the recovery clock Clk_R in the single mode.

The delay circuit DC and the second interpolating circuit IC2 may be interpolated to give a certain delay to the recovery clock Clk_R having a certain cycle so that the identifying operation may be performed at a precise time. The selecting circuit SC may output an external clock Clk_ex to the recovery clock Clk_R.

The phase-difference amplifying circuit (for example, 211 of FIG. 9) according to an embodiment may include the hold circuit (for example, HC1 of FIG. 9) to provide the phase-difference amplifying window having a relatively great width, and thus, the clock recovery circuit 213 may be formed as a relatively simple circuit including the interpolating circuits IC1 and IC2 and the delay circuit DC.

Figure 13:
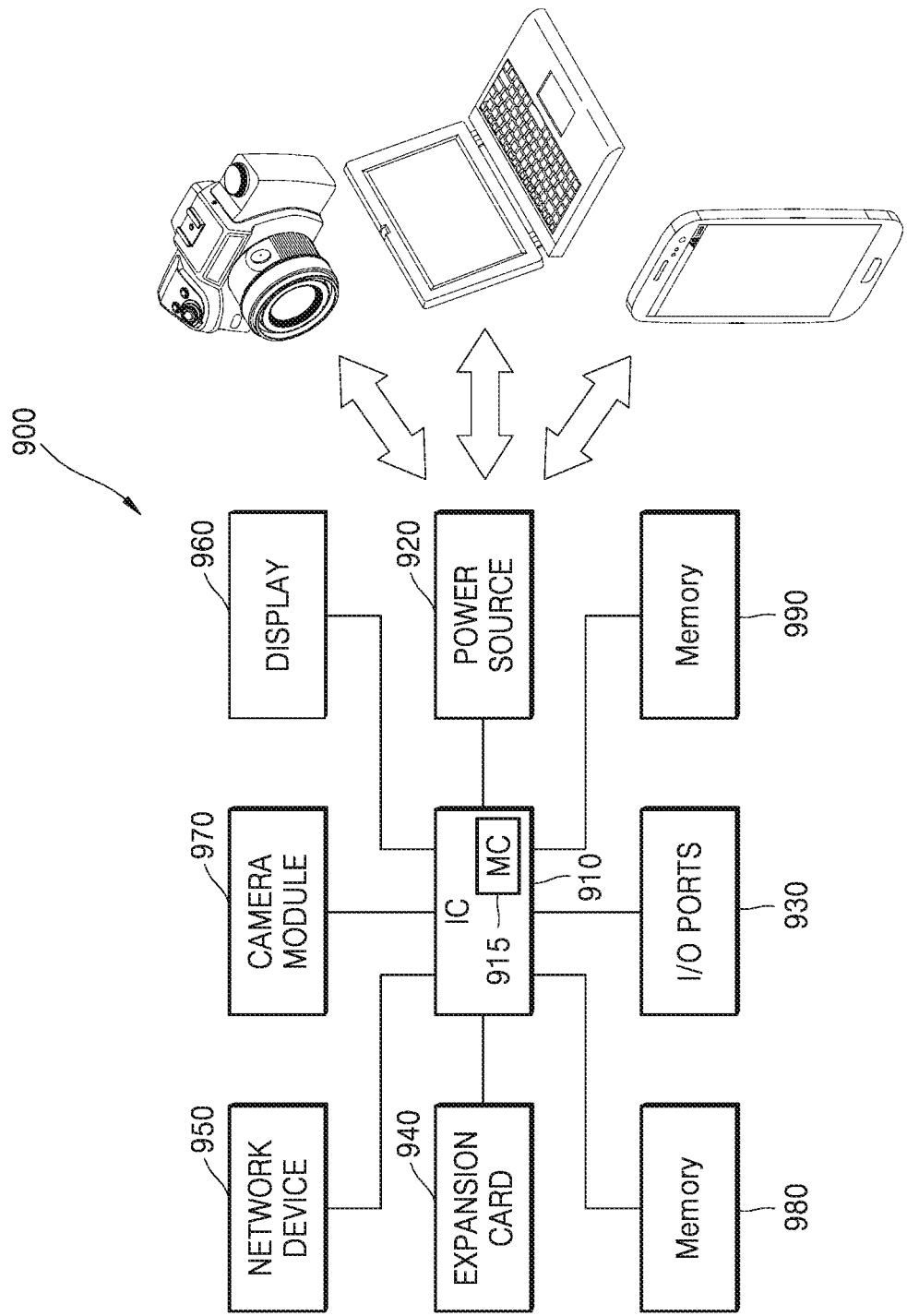
FIG. 13 is a block diagram of a memory system according to an example embodiment.

FIG. 13 is a block diagram of a memory system 900 according to an example embodiment.

Referring to FIG. 13, the memory system 900 may be realized as a portable electronic device, such as a digital camera, a cellular phone, a smartphone, a tablet personal computer (PC), or a mobile Internet device. The memory system 900 may include an integrated circuit 910, a power source 920, input and output (I/O) ports 930, an expansion card 940, a network device 950, a display 960, and/or a plurality of memory devices 980 and 990.

The memory system 900 may further include a camera module 970. The integrated circuit 910 may control an operation of at least one of the components 920 through 970.

The integrated circuit 910 may be realized as a processor, a system on chip (SoC), an application processor, or a mobile application processor.

The integrated circuit 910 may include a memory controller 915 for controlling the plurality of memory devices 980 and 990. The memory controller 915 may be realized outside the integrated circuit 910. The power source 920 may supply an operation voltage to at least one of the components 910, and 930 through 990. The I/O ports 930 may denote ports configured to transmit data to the memory system 900 or transmit data output from the memory system 900 to external devices.

The expansion card 940 may be realized as a secure digital (SD) card or a multimedia card (MMC). The expansion card 940 may be realized as a subscriber identification module (SIM) card or a universal subscriber identity module (USIM) card.

The network device 950 may denote a device configured to connect the memory system 900 to a wireless network. The display 960 may display data output from the I/O ports 930, the expansion card 940, or the network device 950.

The camera module 970 denotes a module configured to convert an optical image into an electrical image. Thus, the electrical image output from the camera module 970 may be stored in the integrated circuit 910 or the expansion card 940. Also, the electrical image output from the camera module 970 may be displayed through the display 960 under control of the integrated circuit 910.

Each of the plurality of memory devices 980 and 990 may be realized as a volatile memory device such as DRAM or a nonvolatile memory device such as flash. The first memory device 980 and the second memory device 990 may differ from each other based on at least one of a physical distance from the memory controller 915, a connection relationship with the memory controller 915, an error correction capacity, and a memory supply voltage.

According to the inventive concepts, the memory controller 915 may transmit data to the first memory device 980 and the second memory device 990 by transmitting a clock, a transition time of which is controlled based on the transmission data.

As above, example embodiments are described in the specification with reference to the drawings. While the inventive concepts have been particularly shown and described with reference to example embodiments thereof by using specific terms, the embodiments and terms have merely been used to explain the inventive concepts and should not be construed as limiting the scope of the inventive concepts as defined by the claims. Therefore, it will be understood by one of ordinary skill in the art that various modifications and equivalent other embodiments can be made from the inventive concepts. Accordingly, the true technical scope of the inventive concepts is defined by the technical spirit of the appended claims.

What is claimed is:

1. A transmitting device comprising:
    at least one first transmitting circuit configured to transmit data via a wired channel by changing a clock transition time based on the data,
    wherein the at least one first transmitting circuit comprises:
        a skew controller configured to output a skew clock generated by controlling a duty ratio and a skew of an input clock; and
        a phase-difference modulator configured to output a transmission signal including information about the data generated by changing a transition time of the skew clock based on the data.

2. The transmitting device of claim 1, wherein the phase-difference modulator comprises:
    a pull-up circuit configured to increase a pull-up current when the data has a first bit;
    a pull-down circuit configured to increase a pull-down current when the data has a second bit; and
    an inverter circuit configured to receive the skew clock and generate a modulating clock by changing the transition time of the skew clock based on the pull-up current and the pull-down current.

3. The transmitting device of claim 2, wherein the pull-up circuit comprises a first pull-up transistor configured to be turned on when the data has the first bit and to supply the pull-up current to the inverter circuit, and
    the pull-down circuit comprises a first pull-down transistor configured to be turned on when the data has the second bit and to withdraw the pull-down circuit from the inverter circuit.

4. The transmitting device of claim 3, wherein the pull-up circuit further comprises at least one second pull-up transistor configured to supply, to the inverter circuit, a basic pull-up current that is less than the pull-up current, and
    the pull-down circuit further comprises at least one second pull-down transistor configured to withdraw, from the inverter circuit, a basic pull-down current that is less than the pull-down current.

5. The transmitting device of claim 2, further comprising:
    an inverter configured to generate a transmission clock included in the transmission signal by buffering the modulating clock.

6. The transmitting device of claim 1, wherein the at least one first transmitting circuit further comprises:
    a serializer configured to sequentially output the data to the phase-difference modulator based on the transition time of the skew clock; and
    a transmitting driver configured to transmit the transmission signal to a receiving device by driving a transmitting channel.

7. The transmitting device of claim 1, further comprising at least one second transmitting circuit configured to generate a reference signal used to identify the data included in the transmission signal.

8. The transmitting device of claim 7, wherein the at least one second transmitting circuit is further configured to determine a transition time of the reference signal based on complementary data having a complementary bit with respect to the data transmitted by the transmission signal.

9. The transmitting device of claim 7, wherein the at least one second transmitting circuit is further configured to allow the reference signal to have a constant transition time regardless of the data.

10. The transmitting device of claim 7, further comprising:
    a mode selector configured to set a mode of the transmitting device as any one of a differential mode and a single mode,
    wherein, in the differential mode, the at least one second transmitting circuit is further configured to determine a transition time of the reference signal based on complementary data which is complementary to the data transmitted by the transmission signal, and in the single mode, the at least one second transmitting circuit is further configured to determine the transition time of the reference signal to be constant, regardless of the data.

* * * * *